United States Patent
Tsubakimoto et al.

(10) Patent No.: US 8,482,170 B2
(45) Date of Patent: Jul. 9, 2013

(54) INSTALLATION STRUCTURE OF A TEMPERATURE SENSOR IN A BRUSH MOTOR AND AN ELECTRIC POWER TOOL INCLUDING SAME

(75) Inventors: Hiroyuki Tsubakimoto, Ritto (JP);
Koichi Hashimoto, Hikone (JP);
Masahide Siratani, Hikone (JP);
Naotake Tanaka, Hikone (JP)

(73) Assignee: Panasonic Corporation, Osaka (JP)

( * ) Notice: Subject to any disclaimer, the term of this patent is extended or adjusted under 35 U.S.C. 154(b) by 294 days.

(21) Appl. No.: 13/092,225

(22) Filed: Apr. 22, 2011

(65) Prior Publication Data
US 2011/0285218 A1    Nov. 24, 2011

(30) Foreign Application Priority Data
May 18, 2010   (JP) ................................ 2010-114412

(51) Int. Cl.
*H02K 11/00*    (2006.01)
(52) U.S. Cl.
USPC ........................... 310/68 C; 310/50; 310/239

(58) Field of Classification Search
USPC .................................. 310/50, 68 C, 238–239
See application file for complete search history.

(56) References Cited

U.S. PATENT DOCUMENTS

| | | | | |
|---|---|---|---|---|
| 4,389,692 A * | 6/1983 | Sander et al. | .................... | 361/29 |
| 4,536,669 A * | 8/1985 | Morishita | ..................... | 310/241 |
| 5,770,901 A * | 6/1998 | Niimi et al. | ...................... | 310/52 |
| 5,994,805 A * | 11/1999 | Iwamoto et al. | ............ | 310/68 C |
| 6,452,295 B1 * | 9/2002 | Iwamoto et al. | ............ | 310/68 C |
| 7,122,925 B2 * | 10/2006 | Utsumi et al. | ................... | 310/71 |
| 7,633,197 B2 * | 12/2009 | Isoda et al. | ................... | 310/68 C |
| 7,722,383 B2 * | 5/2010 | Meyer | ............................ | 439/404 |
| 2002/0047354 A1 * | 4/2002 | Iwamoto et al. | ............ | 310/68 C |
| 2005/0110352 A1 * | 5/2005 | Utsumi et al. | .............. | 310/68 B |

FOREIGN PATENT DOCUMENTS

JP    11-299177    10/1999

* cited by examiner

*Primary Examiner* — Thanh Lam
(74) *Attorney, Agent, or Firm* — Bacon & Thomas, PLLC

(57) ABSTRACT

An installation structure of a temperature sensor in a brush motor includes a holding plate; a metal-made fixing base; and a brush holder arranged on the fixing base to hold a brush in place. The metal-made fixing base is provided on the holding plate, and the fixing base includes a sensor attachment portion to which the temperature sensor is attached. Further, the sensor attachment portion is positioned outside the holding plate.

10 Claims, 3 Drawing Sheets

INSTALLATION STRUCTURE OF A TEMPERATURE SENSOR IN A BRUSH MOTOR AND AN ELECTRIC POWER TOOL INCLUDING SAME

FIELD OF THE INVENTION

The present invention relates to an installation structure of a temperature sensor in a brush motor used as a drive power source of, e.g., an electric power tool.

BACKGROUND OF THE INVENTION

Conventionally, there has been known a brush motor having a temperature detection function, which includes a temperature sensor, e.g., a thermistor, for sensing the temperature near a brush of the motor. For example, JP11-299177A discloses a motor in which a brush holder for holding a brush is arranged on a metal-made fixing base provided on a holding plate whose plane is perpendicular to a motor axis.

The fixing base is fixed to the holding plate by a metal eyelet. The metal eyelet has a through-hole extending through the holding plate and the fixing base in a motor axis direction. A temperature sensor is fixed to the through-hole of the metal eyelet. The temperature sensor outputs a signal to a control unit. Responsive to the signal, the control unit performs drive control of the motor.

In the motor mentioned above, however, the temperature sensor is arranged to overlap with the holding plate in the motor axis direction. Therefore, the wiring line of the temperature sensor needs to be extended to the surface of the holding plate. This involves a difficulty in handling the wiring line and leaves a room for improvement. In case the motor is used in an electric power tool, the handling space of the wiring line of the temperature sensor is designed to have a small size with a view to reduce the size of the electric power tool. Thus, the ease of handling the wiring line becomes a crucial issue.

SUMMARY OF THE INVENTION

In view of the above, the present invention provides an installation structure of a temperature sensor in a brush motor, which is capable of easily handling a wiring line of a temperature sensor, and an electric power tool including same.

In accordance with an aspect of the present invention, there is provided an installation structure of a temperature sensor in a brush motor, including: a holding plate; a metal-made fixing base provided on the holding plate, the fixing base including a sensor attachment portion to which the temperature sensor is attached, the sensor attachment portion being positioned outside the holding plate; and a brush holder arranged on the fixing base to hold a brush in place.

The installation structure may further include a shrinkage tube fixing the temperature sensor to the sensor attachment portion, the shrinkage tube being externally fitted to the temperature sensor and the sensor attachment portion to cover the temperature sensor and the sensor attachment portion in one bundle.

The shrinkage tube may be made of a transparent material.

The sensor attachment portion may include an attachment surface to which the temperature sensor is attached, the attachment surface having an edge formed to have an arc-shaped cross section.

The temperature sensor may include a sensor portion for sensing a temperature and a wiring line extending from the sensor portion, the sensor portion being pressed against the sensor attachment portion by an elastic force of the wiring line.

The sensor attachment portion may include a holding recess for holding the temperature sensor in place.

Preferably, the temperature sensor may be bonded to the sensor attachment portion by an adhesive agent.

The adhesive agent may be composed of a highly heat-conductive material.

Grease composed of a highly heat-conductive material may be applied on the temperature sensor, or a thin film member composed of a highly heat-conductive material may be wound around the temperature sensor.

In accordance with another aspect of the present invention, there is provided an electric power tool including, as a drive power source, a brush motor including the installation structure.

A cooling fan may be attached to the brush motor including the installation structure.

With the present invention, it is possible to easily handle the wiring line of the temperature sensor.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

One embodiment of the present invention will now be described with reference to the accompanying drawings.

Figure 1:
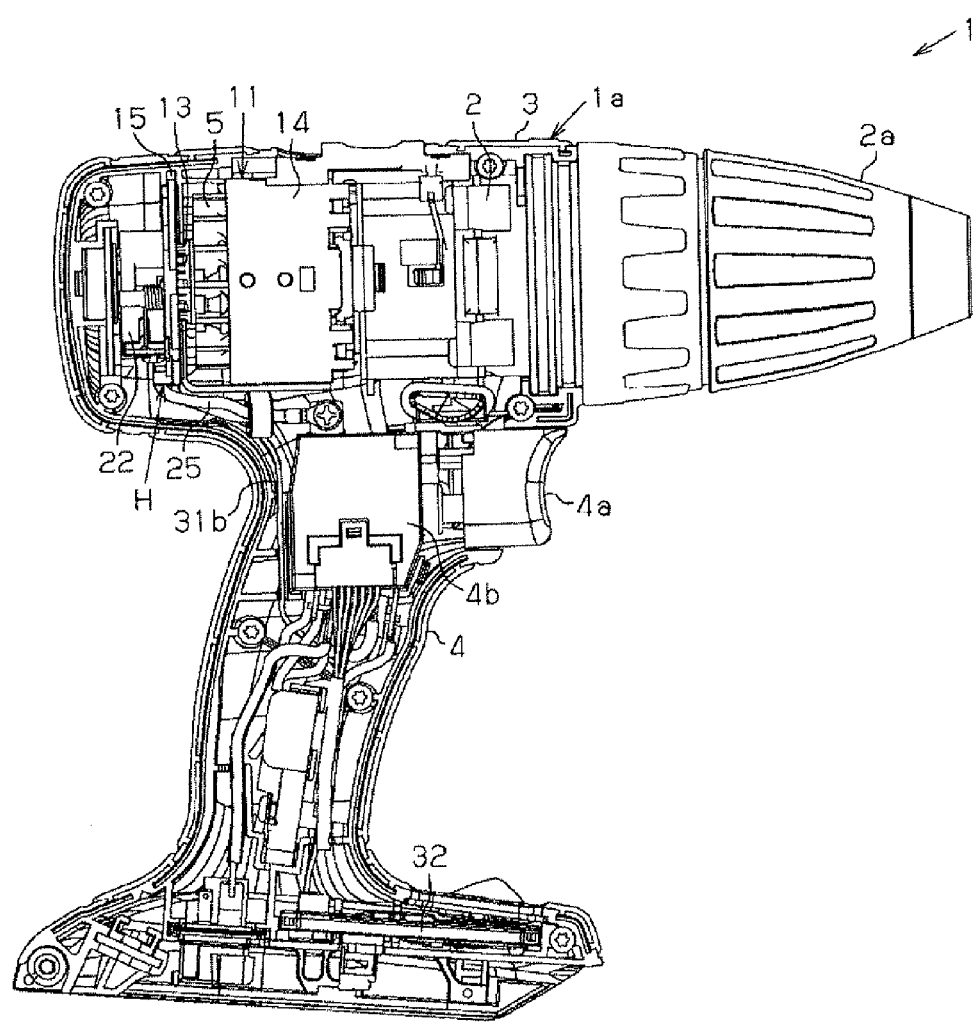
FIG. 1 is a section view showing an electric power tool in accordance with one embodiment of the present invention.

Referring to FIG. 1, an electric power tool 1 of the present embodiment used as, e.g., an electric driver, is a hand-held device that can be held with one hand. The electric power tool 1 includes a body case 1a having a cylindrical trunk portion 3 and a grip portion 4 extending downwards from the trunk portion 3. The trunk portion 3 of the body case 1a accommodates a drive unit 2, and has a tapering tip end portion 2a to which a driver end tool (not shown) can be detachably attached. The driver end tool is rotated by the drive power of a motor 11 arranged within the trunk portion 3.

A trigger switch 4b is arranged within the grip portion 4 and is turned on or off by the operation of a trigger 4a provided to the grip portion 4. The trigger switch 4b is electrically connected to brushes 12 of the motor 11. When the trigger switch 4b is turned on, the motor 11 comes into operation.

The motor 11 is positioned slightly rearwards of the longitudinal center of the trunk portion 3 and is arranged within the trunk portion 3 so that the motor axis can extend along the longitudinal direction of the trunk portion 3. The motor 11 is a DC motor in which an electric current is supplied to a coil (not shown) for generation of rotating magnetic fields through the brushes 12 and a commutator 13. The motor 11 includes a substantially cylindrical motor case 14 for accommodating a coil, a rotor and a stator, all of which are not shown in the drawings. A cooling fan 5 for cooling the coil, the brushes 12 and other components are provided in the motor 11. When the motor 11 is driven, the cooling fan 5 is rotated to generate a cooling effect.

Figure 2A:
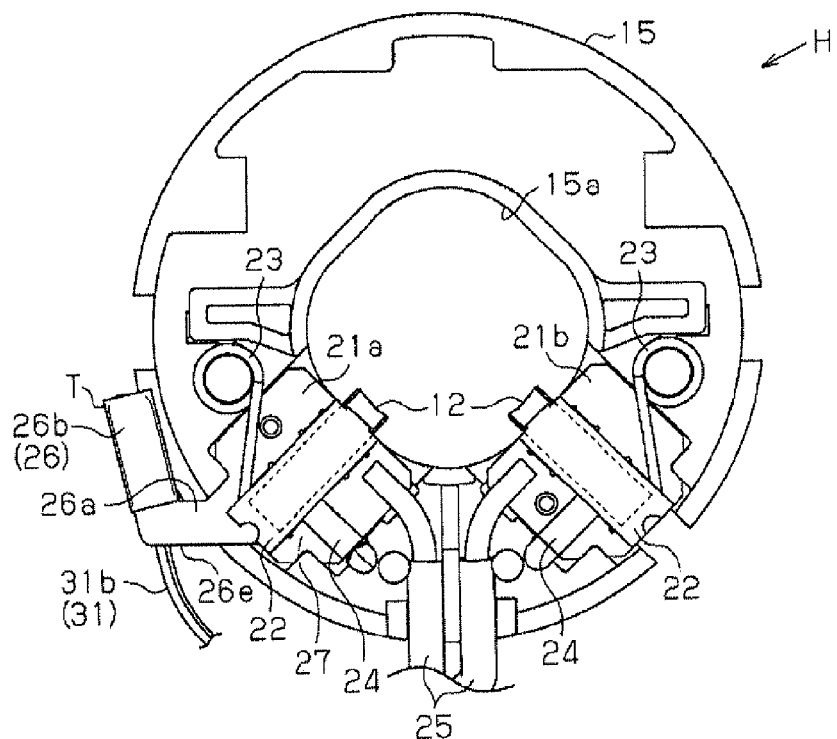
FIG. 2A is a plan view of a holder unit as seen from the opposite side of a motor case.
Figure 2B:
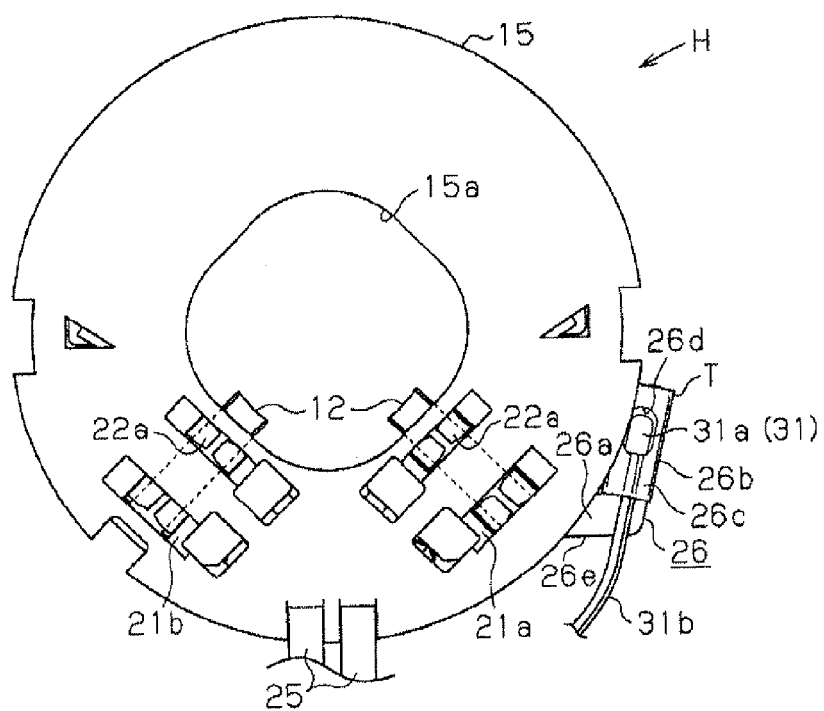
FIG. 2B is a plan view of the holder unit as seen from the side of the motor case.

A holder unit H for holding the brushes 12 in place is provided at the rear side (opposite to the output side) of the motor 11. The holder unit H includes a holding plate 15 (see FIG. 2) formed of a disk-shaped plate. The holding plate 15 has a plane perpendicular to the motor axis. As shown in FIGS. 2A and 2B, the holding plate 15 has a through-hole 15a defined in the central area thereof. The commutator 13 is inserted into the through-hole 15a. The lower side in FIGS. 2A and 2B corresponds to the lower side of the electric power tool 1 (i.e., the side of the grip portion 4).

As shown in FIG. 2A, two metal-made plate-like fixing bases 21a and 21b are secured to the opposite surface of the holding plate 15 from the motor case 14. Brush holders 22 having a substantially U-shaped cross section are fixed to the respectively fixing bases 21a and 21b. In FIG. 2A, the fixing bases 21a and 21b are respectively provided in the left lower and right lower sides of the through-hole 15a. The brush holders 22 are arranged such that the open ends thereof are closed by the fixing bases 21a and 21b. Rectangular accommodation spaces are defined between the fixing bases 21a and 21b and the brush holders 22. The brushes 12 are arranged within the respective accommodation spaces.

Each of the brush holders 22 is provided with a plurality of fixing pieces 22a, and is fixed to the corresponding fixing base 21a or 21b and the holding plate 15 by means of the fixing pieces 22a (see FIG. 23).

Spring members 23 for pressing the brushes 12 toward the center of the holding plate 15 are held on the surface of the holding plate 15 on which the fixing bases 21a and 21b exist.

The brushes 12 arranged between the fixing bases 21a and 21b and the brush holders 22 are respectively electrically connected to the fixing bases 21a and 21b through pigtails 24. Power supply lead wires 25 extending from the trigger switch 4b are respectively connected to the fixing bases 21a and 21b to electrically interconnect the fixing bases 21a and 21b and the trigger switch 4b. The power supply from the trigger switch 4b to the brushes 12 can be controlled by operating the trigger 4a.

A sensor attachment portion 26 for attachment of a thermistor 31 as a temperature sensor is formed to extend from one of the fixing bases 21a and 21b (e.g., the left fixing base 21a in FIG. 2A) so that it can be positioned outside the holding plate 15. The sensor attachment portion 26 has a flat shape substantially parallel to the plane of the holding plate 15 and also has a curved shape.

Specifically, the sensor attachment portion 26 includes a first extension portion 26a rectilinearly extending from a base body 27 of the fixing base 21a or 21b to which the brush holder 22 is attached and a second extension portion 26b rectilinearly extending from the first extension portion 26a in a direction intersecting the extension direction of the first extension portion 26a. The second extension portion 26b is formed to generally conform to the outer circumference of the holding plate 15 and is positioned obliquely below the holding plate 15. A holding recess 26d is formed on the surface (attachment surface 26c) of the second extension portion 26b which faces the motor case 14 exists.

The thermistor 31 is fixed to the second extension portion 26b of the sensor attachment portion 26 by a shrinkage tube T formed of a transparent member. Specifically, the thermistor 31 includes a substantially cylindrical sensor portion 31a and a wiring line 31b extending from the lower side of the sensor portion 31a. The sensor portion 31a of the thermistor 31 is accommodated within the holding recess 26d of the second extension portion 26b. The sensor portion 31a of the thermistor 31 is arranged such that the wiring line 31b is led out in a direction parallel to the attachment surface 26c. The shrinkage tube T is externally fitted to both the thermistor 31 accommodated within the holding recess 26d and the second extension portion 26b of the sensor attachment portion 26 so that it can cover the thermistor 31 and the second extension portion 26b in one bundle (see FIG. 3).

The wiring line 31b of the thermistor 31 is connected at one end thereof to the base end portion of the sensor portion 31a and at the other end thereof to a control circuit board 32 accommodated within the lower end extension of the grip portion 4. The control circuit board 32 performs drive control of the motor 11 in response to a signal outputted from the thermistor 31.

The shrinkage tube T is attached by externally fitting it to the thermistor 31 and the second extension portion 26b of the sensor attachment portion 26. At this time, the shrinkage tube T is externally fitted until it comes into contact with the first extension portion 26a. Thereafter, the shrinkage tube T is shrunken by heating the same with a heater (not shown), whereby the thermistor 31 is fixed to the second extension portion 26b of the sensor attachment portion 26.

With the configuration in which the thermistor 31 is fixed to the sensor attachment portion 26 by the shrinkage tube T, it is possible to easily fix the thermistor 31 to the sensor attachment portion 26 by just externally fitting the shrinkage tube T to the thermistor 31 and the sensor attachment portion 26 and then heating the shrinkage tube T. Since the shrinkage tube T is transparent, it is possible to visually confirm the attachment state (e.g., the attachment position) of the thermistor 31 with respect to the holding recess 26 of the sensor attachment portion 26 (the second extension portion 26b). Inasmuch as the shrinkage tube T comes into contact with the first extension portion 26a during the external fitting process, it is possible to easily determine the position of the shrinkage tube T.

Figure 3:
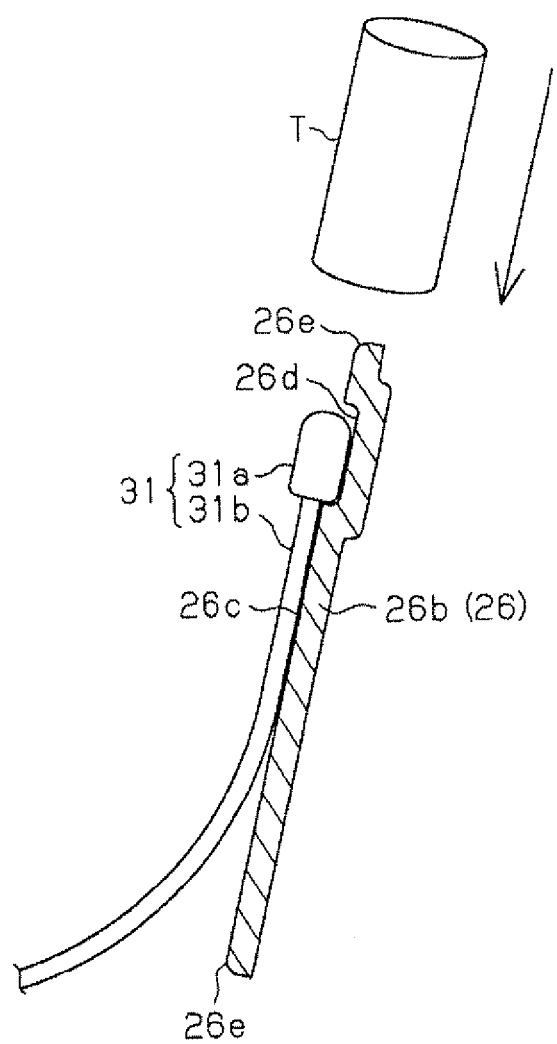
FIG. 3 is a view for explaining an installation structure of a temperature sensor (e.g., a thermistor).

As shown in FIG. 3, an edge 26e of the attachment surface 26c of the sensor attachment portion 26, i.e., the surface (facing the motor case 14) to which the thermistor 31 is attached is formed to have an arc-shaped cross section. In other words, the edge 26e of the attachment surface 26c is rounded when the fixing bases 21a and 21b is punched for example.

With the configuration in which the edge 26e of the attachment surface 26c is rounded, it is possible to prevent the wiring line 31b of the thermistor 31 from being damaged by the interference with the edge 26e of the attachment surface 26c. This makes it possible to protect the wiring line 31b of the thermistor 31 from injury.

The wiring line 31b of the thermistor 31 is led out from the base end portion of the sensor portion 31a making contact with the attachment surface 26c (the holding recess 26d) and is gradually spaced apart from the attachment surface 26c. As a result, the sensor portion 31a is pressed against the holding recess 26d of the sensor attachment portion 26 by the elastic force of the wiring line 31b. It is important that the sensor portion 31a makes reliable contact with a temperature measurement target (the attachment surface 26c or the holding recess 26d in the present embodiment). With the configuration set forth above, the sensor portion 31a of the thermistor 31 is reliably brought into contact with the holding recess 26d (the attachment surface 26c) of the sensor attachment portion 26. This makes it possible to reduce contact variations occurring in the assembling process and, consequently, to stabilize the mass production quality.

In the present embodiment, the thermistor 31 is attached to the second extension portion 26b of the sensor attachment portion 26 positioned outside (radially outwards of) the holding plate 15. This eliminates the need to extend the wiring line 31b of the thermistor 31 toward the plane of the holding plate 15, which makes it possible to easily handle the wiring line 31b of the thermistor 31. In addition, the thermistor 31 is arranged to extend along the attachment surface 26c of the sensor attachment portion 26 (the surface substantially parallel to the plane of the holding plate 15), and the wiring line 31b of the thermistor 31 is led out in a substantially parallel relationship with the plane of the holding plate 15. This eliminates the need to heavily bend the wiring line 31b of the thermistor 31 near the root of the sensor portion 31a or to extend the wiring line 31b along the direction perpendicular to the holding plate 15 (the motor axis direction), which makes it possible to easily handle the wiring line 31b within a limited space.

Moreover, the sensor portion 31a of the thermistor 31 makes contact with the sensor attachment portion 26 of the fixing base 21a kept in contact with the corresponding brush 12. This makes it possible to detect the temperature near the brush 12 with increased fidelity. In a nutshell, it is possible in the present embodiment to prevent occurrence of damage in the wiring line 31b of the thermistor 31, to easily attach the thermistor 31 within a limited space and to detect temperature near the brush 12 with increased fidelity.

Unlike the present embodiment, in case of the conventional configuration in which the sensor portion 31a is arranged such that the wiring line 31b of the thermistor 31 is led out in the direction perpendicular to the attachment surface 26c (see, e.g., JP11-299177A), the wiring line 31b of the thermistor 31 needs to be perpendicularly bent near the root of the sensor portion 31a with a view to reduce the size of the electric power tool 1.

In the present embodiment, however, the sensor portion 31a is arranged such that the wiring line 31b of the thermistor 31 is led out in the direction parallel to the attachment surface 26c. This eliminates the need to perpendicularly bend the wiring line 31b near the root of the sensor portion 31a, thereby making it possible to smoothly handle the wiring line 31b. Due to the fact that the hand-held electric power tool 1 needs to be designed in a size-reducing and space-saving manner, the configuration of the present embodiment assuring easy handling of the wiring line 31b of the thermistor 31 is particularly advantageous.

Next, certain characteristic effects offered by the present embodiment will be set forth below.

(1) The brush holders 22 for holding the brushes 12 in place are arranged on the metal-made fixing bases 21a and 21b provided above the holding plate 15. The sensor attachment portion 26 for attachment of the thermistor 31 is arranged in one of the fixing bases 21a and 21b such that that it is positioned outside the holding plate 15. The thermistor 31 is attached to the sensor attachment portion 26. This eliminates the need to extend the wiring line 31b of the thermistor 31 toward the plane of the holding plate 15, which makes it possible to easily handle the wiring line 31b of the thermistor 31 within a limited space.

(2) The thermistor 31 is fixed to the sensor attachment portion 26 by the shrinkage tube T which is externally fitted to the thermistor 31 and the sensor attachment portion 26 such that it can cover the thermistor 31 and the sensor attachment portion 26 in one bundle. Accordingly, it is possible to easily fix the thermistor 31 to the sensor attachment portion 26 by just externally fitting the shrinkage tube T to the thermistor 31 and the sensor attachment portion 26 and then heating the shrinkage tube T.

(3) Since the shrinkage tube T is made of a transparent material, it is possible to visually confirm the attachment state (e.g., the attachment position) of the thermistor 31 with respect to the sensor attachment portion 26.

(4) Since the edge 26e of the attachment surface 26c of the sensor attachment portion 26 is formed to have an arc-shaped cross section, it is possible to prevent the wiring line 31b of the thermistor 31 from being damaged by the contact with the edge 26e of the attachment surface 26c.

(5) The thermistor 31 includes the sensor portion 31a and the wiring line 31b extending from the sensor portion 31a. The sensor portion 31a is pressed against the sensor attachment portion 26 by the elastic force of the wiring line 31b. With this configuration, the sensor portion 31a can be reliably brought into contact with the sensor attachment portion 26. This makes it possible to reduce contact variations occurring in the assembling process and, consequently, to stabilize the mass production quality.

(6) The sensor attachment portion 26 is provided with the holding recess 26d for holding the thermistor 31 in place. With this configuration, it is possible to stably hold the thermistor 31 in the holding recess 26d of the sensor attachment portion 26.

(7) The sensor attachment portion 26 has a curved shape and the shrinkage tube T comes into contact with the curved portion (the first extension portion 26a) of the sensor attachment portion 26. This makes it possible to determine the position of the shrinkage tube T, thereby enhancing the fixation capability of the shrinkage tube T.

(8) The cooling fan 5 is mounted to the motor 11. Therefore, if the motor 11 whose temperature is increased is subjected to control (rotation-permitting control) in which the motor 11 is not kept completely stopped but is rotated with a limited rotation output, it is possible to forcedly cool the motor 11 with the cooling fan 5 while driving the motor 11 in a load-free condition. This makes it possible to shorten the time within which the motor 11 comes back to a normal operation. As a consequence, it becomes possible for a user of the electric power tool 1 to enjoy improved continuous workability.

The embodiment of the present invention may be modified as follows.

In the foregoing embodiment, the thermistor 31 may be adhesively bonded to the sensor attachment portion 26 with an adhesive agent having elasticity. This configuration makes it possible to prevent the wiring line 31b in the root of the sensor portion 31a from being damaged by impulsive loads or vibrations occurring when the electric power tool 1 is in use. If the adhesive agent is composed of a highly heat-conductive material (e.g., silicon or other adhesive agents containing a highly heat-conductive additive), it is possible to efficiently transfer the heat from the sensor attachment portion 26 to the thermistor 31.

In the foregoing embodiment, grease composed of a highly heat-conductive material may be applied on the thermistor 31. Moreover, a thin film member composed of a highly heat-conductive material (e.g., aluminum) may be wound around the thermistor 31. With this configuration, it is possible to efficiently transfer the heat from the sensor attachment portion 26 to the thermistor 31.

In the foregoing embodiment, the sensor attachment portion 26 is formed into a curved shape from the first extension portion 26a and the second extension portion 26b, and the thermistor 31 is attached to the second extension portion 26b. However, the present invention is not particularly limited thereto. For example, the second extension portion 26*b* may be omitted and the thermistor 31 may be attached to the first extension portion 26*a*.

In the foregoing embodiment, the present invention is applied to the motor 11 used as a drive power source of the electric power tool 1. However, the present invention is not particularly limited thereto. The present invention may be applied to a motor used in other devices than the electric power tool 1.

While the number of the brushes 12 is two in the foregoing embodiment, the present invention is not particularly limited thereto. The number of the brushes 12 may be three or more.

While the holding recess 26*d* is provided on the attachment surface 26*c* of the sensor attachment portion 26 in the foregoing embodiment, the present invention is not particularly limited thereto. The attachment surface 26*c* may be a planar surface with no holding recess.

While the present invention is applied to the motor 11 mounted with the cooling fan 5 in the foregoing embodiment, it is apparent that the advantageous effects on the ease of attachment and the size-reducing space-saving design remain the same in a motor with no cooling fan.

While the invention has been shown and described with respect to the embodiments, it will be understood by those skilled in the art that various changes and modifications may be made without departing from the scope of the invention as defined in the following claims.

What is claimed is:

1. An installation structure of a temperature sensor in a brush motor, comprising:
   a holding plate;
   a metal-made fixing base provided on the holding plate, the fixing base including a sensor attachment portion to which the temperature sensor is attached, the sensor attachment portion being positioned outside the holding plate; and
   a brush holder arranged on the fixing base to hold a brush in place.

2. The installation structure of claim 1, further comprising:
   a shrinkage tube fixing the temperature sensor to the sensor attachment portion, the shrinkage tube being externally fitted to the temperature sensor and the sensor attachment portion to cover the temperature sensor and the sensor attachment portion in one bundle.

3. The installation structure of claim 2, wherein the shrinkage tube is made of a transparent material.

4. The installation structure of claim 1, wherein the sensor attachment portion includes an attachment surface to which the temperature sensor is attached, the attachment surface having an edge formed to have an arc-shaped cross section.

5. The installation structure of claim 1, wherein the temperature sensor includes a sensor portion for sensing a temperature and a wiring line extending from the sensor portion, the sensor portion being pressed against the sensor attachment portion by an elastic force of the wiring line.

6. The installation structure of claim 1, wherein the sensor attachment portion includes a holding recess for holding the temperature sensor in place.

7. The installation structure of claim 1, wherein the temperature sensor is bonded to the sensor attachment portion by an adhesive agent.

8. The installation structure of claim 7, wherein the adhesive agent is composed of a highly heat-conductive material.

9. The installation structure of claim 1, wherein grease composed of a highly heat-conductive material is applied on the temperature sensor, or a thin film member composed of a highly heat-conductive material is wound around the temperature sensor.

10. An electric power tool comprising, as a drive power source, a brush motor including the installation structure of claim 1.

* * * * *